United States Patent
Li et al.

(10) Patent No.: US 12,327,859 B2
(45) Date of Patent: Jun. 10, 2025

(54) METHOD FOR COATING LITHIUM NICKEL COBALT MANGANESE OXIDE CATHODE MATERIAL

(71) Applicants: Guangdong Brunp Recycling Technology Co., Ltd., Foshan (CN); Hunan Brunp Recycling Technology Co., Ltd., Changsha (CN)

(72) Inventors: Aixia Li, Foshan (CN); Haijun Yu, Foshan (CN); Yinghao Xie, Foshan (CN); Changdong Li, Foshan (CN)

(73) Assignees: Guangdong Brunp Recycling Technology Co., Ltd., Foshan (CN); Hunan Brunp Recycling Technology Co., Ltd., Changsha (CN)

( * ) Notice: Subject to any disclaimer, the term of this patent is extended or adjusted under 35 U.S.C. 154(b) by 0 days.

(21) Appl. No.: 18/284,436

(22) PCT Filed: Sep. 22, 2022

(86) PCT No.: PCT/CN2022/120637
§ 371 (c)(1),
(2) Date: Sep. 27, 2023

(87) PCT Pub. No.: WO2024/021276
PCT Pub. Date: Feb. 1, 2024

(65) Prior Publication Data
US 2025/0070116 A1    Feb. 27, 2025

(30) Foreign Application Priority Data
Jul. 29, 2022 (CN) .......................... 202210903702.5

(51) Int. Cl.
| H01M 4/04 | (2006.01) |
| H01M 4/505 | (2010.01) |
| H01M 4/525 | (2010.01) |
| H01M 4/02 | (2006.01) |

(52) U.S. Cl.
CPC ......... *H01M 4/0471* (2013.01); *H01M 4/505* (2013.01); *H01M 4/525* (2013.01); *H01M 2004/028* (2013.01)

(58) Field of Classification Search
None
See application file for complete search history.

(56) References Cited

U.S. PATENT DOCUMENTS

2015/0016024 A1    1/2015   Choi et al.

FOREIGN PATENT DOCUMENTS

| CN | 110462773 A | 11/2019 |
| CN | 111769265 A | 10/2020 |

OTHER PUBLICATIONS

International Search Report for Application No. PCT/CN2022/120637, dated Jul. 29, 2022, 6 pages.
Written Opinion of the International Searching Authority for Application No. PCT/CN2022/120637, dated Jul. 29, 2022, 6 pages.

*Primary Examiner* — Carlos Barcena
(74) *Attorney, Agent, or Firm* — Leason Ellis LLP

(57) ABSTRACT

The present disclosure discloses a method for coating a lithium nickel cobalt manganese oxide cathode material, and relates to the technical field of the synthesis of cathode materials. The present disclosure provides a method for coating a lithium nickel cobalt manganese oxide cathode material, comprising the following steps: (1) mixing the lithium nickel cobalt manganese oxide cathode material with a potassium permanganate solution, and introducing an olefin; and (2) after a reaction is completed, a reaction product is dried and calcinated to obtain a manganese-dioxide-coated lithium nickel cobalt manganese oxide cathode material; wherein the number of carbon atoms in the olefin is ≤10, and the number of carbon-carbon double bonds in the olefin is 1. By introducing an olefin when mixing a lithium nickel cobalt manganese oxide cathode material with a potassium permanganate solution, directed coating of surface defects is realized.

9 Claims, 1 Drawing Sheet

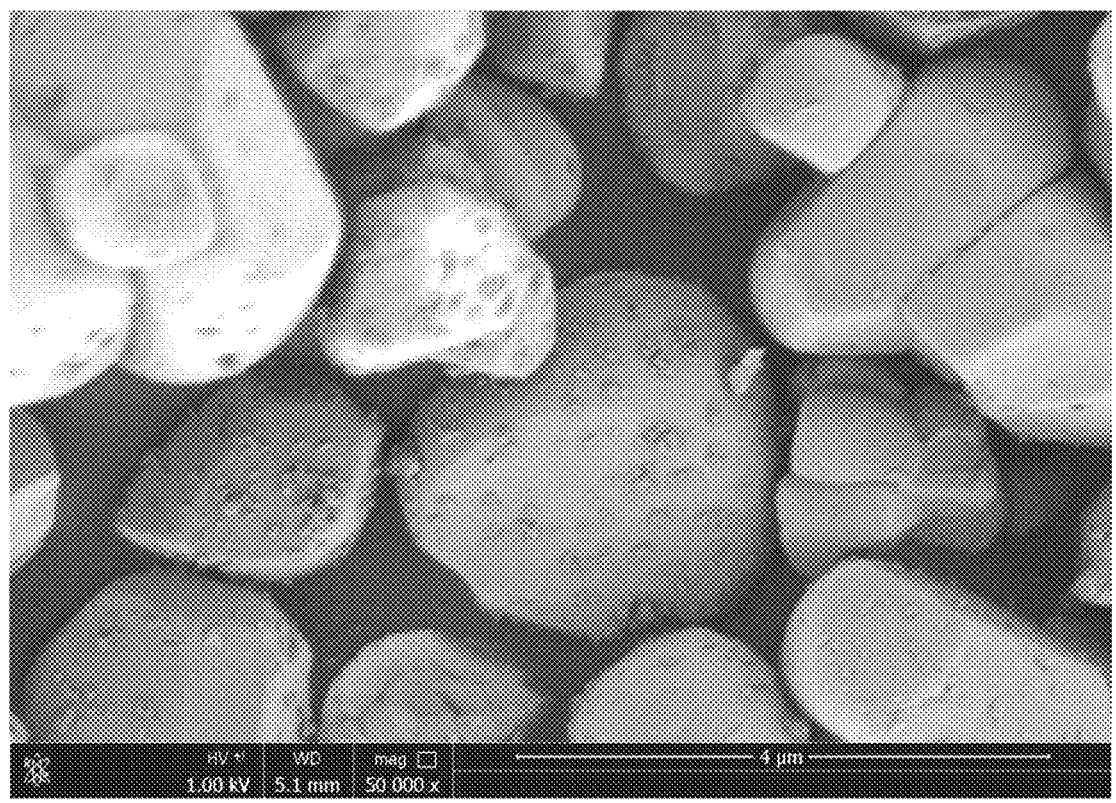

METHOD FOR COATING LITHIUM NICKEL COBALT MANGANESE OXIDE CATHODE MATERIAL

CROSS-REFERENCE TO RELATED APPLICATIONS

The present application is a national phase entry under 35 USC § 371 of International Application PCT/CN2022/120637, filed Sep. 22, 2022, which claims the benefit of and priority to Chinese Patent Application No. 202210903702.5, filed Jul. 29, 2022, the entire disclosures of which are incorporated herein by reference.

TECHNICAL FIELD

The present disclosure relates to the technical field of the synthesis of cathode materials, in particular to a method for coating lithium nickel cobalt manganese oxide cathode material.

BACKGROUND

Lithium nickel cobalt manganese oxide cathode materials, especially ultra-high-nickel cathode materials with an Ni content of more than 90%, are prone to residual lithium generation on the surface. The residual lithium on the surface mainly refers to substances such as LiOH and $Li_2CO_3$ on the surface of the material particles. On the one hand, the source thereof is caused by the fact that Li which does not enter the interior through sintering reaction remains on the surface or that high-temperature sintering leads to the decomposition of the material to produce residual lithium on the surface, and on the other hand, the source is generated by placing the material in the air for a long period of time. The higher the Ni content, the harsher the sintering conditions, and the more difficult to sinter to form a material with a specific lithium metal proportion, resulting in more residual lithium on the surface of the sintered product. In addition, the higher the Ni content, the easier for $Li^+$ to react with water and $CO_2$ in the air to produce LiOH and $Li_2CO_3$, resulting in high residual lithium on the surface. With the increase of the Ni content, manganese easily dissolves from the lithium nickel cobalt manganese oxide cathode material during cycling and precipitates at the negative electrode to destroy an SEI film of the negative electrode. During cycling, $Mn^{3+}$ undergoes disproportionation reactions to form $Mn^{4+}$ and $Mn^{2+}$, leading to crushed cathode particles, further affecting the cycling performance of the cathode material. Some surface defects, such as dents and fractures, will inevitably be formed on the surface of the cathode material, and these surface defects contribute to side reactions between the cathode material and the electrolyte solution.

By forming a coating layer on the surface of the cathode material, some surface defects can be repaired and the side reactions between the cathode material and the electrolyte solution can be alleviated; however, conventional coating methods have some problems. The conventional coating methods involve randomly forming some coating areas on the surface of the material. The uniformity thereof is difficult to ensure, and there is less coating agent, which may result in some areas, especially surface defect areas, not being coated, and the electrolyte solution may undergo side reactions with the cathode material in surface defect areas. In addition, if the amount of the coating agent is increased, local coating may be too thick, which may decrease the specific capacity and at the same time also increase the impedance.

SUMMARY

In view of this, an object of the present disclosure is to provide a method for coating a lithium nickel cobalt manganese oxide cathode material in order to overcome the above shortcomings of the prior art. The present disclosure provides a method for coating a lithium nickel cobalt manganese oxide cathode material. By introducing an olefin when mixing a lithium nickel cobalt manganese oxide cathode material with a potassium permanganate solution, directed coating of surface defects is realized, and the electrolyte solution can be well prevented from undergoing side reactions with the cathode material in the surface defects, without generating an excessively thick coating layer.

To achieve the above object, the technical solution used in the present disclosure is a method for coating a lithium nickel cobalt manganese oxide cathode material, comprising the following steps:
(1) mixing the lithium nickel cobalt manganese oxide cathode material with a potassium permanganate solution, and introducing an olefin; and
(2) after a reaction is completed, a reaction product is dried and calcinated to obtain a manganese-dioxide-coated lithium nickel cobalt manganese oxide cathode material;
wherein the number of carbon atoms in the olefin is ≤10, and the number of carbon-carbon double bonds in the olefin is 1.

In the present disclosure, by introducing an olefin when mixing a lithium nickel cobalt manganese oxide cathode material with a potassium permanganate solution, adhering to the surface defect areas (pits, cracks, etc.) on the surface of the cathode material becomes easier, and the adhered gas can react with potassium permanganate in the solution in the defect areas to form $MnO_2$ precipitate to make up for the defects, whereby directed coating of surface defects is realized, and the electrolyte solution can be well prevented from causing side reactions with the cathode material in the surface defects, without generating an excessively thick coating layer. In addition, the olefin gas reacts with the potassium permanganate solution to form a precipitate, which has smaller particles and more uniform coating. Coating $MnO_2$ on the surface defects can result in the formation of an $MnO_2$-enriched layer inside and outside the surface of the cathode material, which can inhibit the dissolution of $MnO_2$ inside the cathode material and a disproportionation reaction of $Mn^{3+}$. By-products (such as alcohols) produced by the reaction can be dissolved in the solution and removed, and the unreacted gas is cleaned up in the drying stage, so that it will not react with the material, resulting in the reduction of the cathode material.

Furthermore, in the present disclosure, it is also possible to place the cathode material in a reducing gas. The cathode material is placed in a high-pressure olefin environment, so that the olefin enters the interior of the cathode material through surface defects to mix the cathode material with the potassium permanganate solution. The olefin gas gradually escapes from the solution, and the olefin undergoes a redox reaction with potassium permanganate to form manganese dioxide, which precipitates on the surface defects.

Preferably, the olefin is at least one of ethylene or propylene; further preferably, the olefin is ethylene.

Preferably, in step (1), the mass concentration of the potassium permanganate solution is 0.5-5%, the pH value of the potassium permanganate solution is 7-12, and a temperature of the mixing is 10-50° C. Further preferably, the mass concentration of the potassium permanganate solution is 0.5-2%, and the temperature of the mixing is 10-25° C.

The inventors have found that within the above-mentioned ranges of the mass concentration of the potassium permanganate solution and the reaction temperature, the reaction rate is relatively slow, and the loss of bubbles before they reach the surface defects can be reduced.

Preferably, in step (1), the method for introducing the olefin involves introducing the olefin in batches, wherein during the introduction of the olefin, a gas pump is used, and the gas pump has a gas pipe equipped with a filter element.

Preferably, the number of introducing the olefin is 3-10 times, and the ratio of the total volume of the introduced olefin to the volume of the potassium permanganate solution is (0.3-1): 1. Further preferably, the number of introducing the olefin is 3-5 times, and the ratio of the total volume of the introduced olefin to the volume of the potassium permanganate solution is (0.3-0.5): 1.

After a lot of experimental investigations, the inventors have found that by limiting the times of introducing the olefin and the amount of the introduced olefin, the reaction can be controlled more thoroughly and the final coating effect is better.

Preferably, the pressure of the gas pump is 0.013-0.020 MPa, and the pore size of the filter element is 0.2-0.5 μm.

After a lot of experimental investigations, the inventors have found that the pore diameter of the filter element is the main factor that affects the bubble size of the introduced gas. When the pore size of the filter element is 0.2-0.5 μm, the bubble size of the introduced gas is appropriate and the coating effect is better.

Preferably, in step (2), the drying temperature is 60-80° C., and the drying time is 8-12 h; and the calcination temperature is 450-550° C., and the calcination time is 6-8 h.

Furthermore, the present disclosure provides a lithium nickel cobalt manganese oxide cathode material obtained by using the above-mentioned method for coating a lithium nickel cobalt manganese oxide cathode material.

Furthermore, the present disclosure provides the use of the lithium nickel cobalt manganese oxide cathode material in the manufacture of a lithium ion battery.

Compared with the prior art, the present disclosure has the following beneficial effects:

In the present disclosure, by introducing an olefin when mixing a lithium nickel cobalt manganese oxide cathode material with a potassium permanganate solution, adhering to the surface defect areas (pits, cracks, etc.) on the cathode material becomes easier, and the adhered gas can react with the potassium permanganate in the solution in the defect areas to form $MnO_2$ precipitate to make up for the defects, whereby directed coating of surface defects is realized, and the electrolyte solution can be well prevented from causing side reactions with the cathode material in the surface defects, without generating an excessively thick coating layer.

BRIEF DESCRIPTION OF DRAWING

The FIGURE is a diagram of a manganese-dioxide-coated lithium nickel cobalt manganese oxide cathode material prepared in Example 1.

DETAILED DESCRIPTION

In order to better illustrate the object, technical solution and advantages of the present disclosure, the present disclosure will be further illustrated below in conjunction with the accompanying drawings and specific examples.

In the examples, the experimental methods used are all conventional methods unless otherwise specified, and the used materials, reagents etc. can all be obtained from commercial sources unless otherwise specified.

Examples 1-6 and Comparative Examples 1 and 2 are provided as below.

Example 1

This example provided a method for coating a lithium nickel cobalt manganese oxide cathode material. The olefin used was ethylene, and the method comprised the following steps:

(1) mixing 500 g of lithium nickel cobalt manganese oxide cathode material ($LiNi_{0.9}CO_{0.05}Mn_{0.05}O_2$) with a potassium permanganate solution, and introducing an olefin in batches, wherein during the introduction of ethylene, a gas pump was used, and the gas pump had a gas pipe equipped with a filter element (PE filter element);

the potassium permanganate solution had a mass concentration of 0.5% and a pH of 8, and the mixing reaction temperature was 20° C.; the number of introducing the ethylene was 5 times, the volume of the olefin introduced each time was 100 $cm^3$, the ratio of the total volume of the introduced ethylene to the volume of the potassium permanganate solution was 0.5:1, and specifically, the total volume of ethylene used was 500 $cm^3$, the volume of the potassium permanganate solution was 1 L; the pressure of the gas pump was 0.018 MPa, and the pore size of the filter element was 0.45 μm; and (2) after the reaction is completed, the reaction product was dried and calcinated to obtain a manganese-dioxide-coated lithium nickel cobalt manganese oxide cathode material;

wherein the drying temperature was 70° C., and the drying time was 10 h; and the calcination temperature was 450° C., and the calcination time was 8 h.

Example 2

This example provided a method for coating a lithium nickel cobalt manganese oxide cathode material. The only difference between this example and Example 1 lay in that in step (1), the olefin used was propylene; the potassium permanganate solution had a mass concentration of 0.5% and a pH of 8, and the mixing reaction temperature was 20° C.; the number of introducing the propylene was 5 times, the volume of the olefin introduced each time was 100 $cm^3$, the ratio of the total volume of propylene to the volume of the potassium permanganate solution was 0.5:1, and specifically, the total volume of propylene used was 500 $cm^3$, the volume of the potassium permanganate solution was 1 L; the pressure of the gas pump was 0.018 MPa, and the pore size of the filter element was 0.45 μm.

Example 3

This example provided a method for coating a lithium nickel cobalt manganese oxide cathode material. The only difference between this example and Example 1 lay in that in step (2), the calcination temperature was 550° C., and the calcination time was 6 h.

Example 4

This example provided a method for coating a lithium nickel cobalt manganese oxide cathode material. The only difference between this example and Example 1 lay in that in step (1), the number of introducing the ethylene was 3 times, the volume of the olefin introduced each time was 100 cm$^3$, and the ratio of the total volume of the introduced ethylene to the volume of the potassium permanganate solution was 0.3:1; specifically, the total volume of ethylene used was 300 cm$^3$, and the volume of the potassium permanganate solution was 1 L.

Example 5

This example provided a method for coating a lithium nickel cobalt manganese oxide cathode material. The difference between this example and Example 1 only lay in that in step (1), during the introduction of the olefin in batches, a gas pump was used, and the gas pipe of the gas pump was not equipped with a filter element.

Example 6

This example provided a method for coating a lithium nickel cobalt manganese oxide cathode material. The only difference between this example and Example 1 lay in that in step (1), the potassium permanganate solution had a mass concentration of 5% and a pH of 8, and the mixing reaction temperature was 50° C.; the number of introducing the ethylene was 5 times, the volume of the olefin introduced each time was 200 cm$^3$, the ratio of the total volume of the introduced ethylene to the volume of the potassium permanganate solution was 1:1; specifically, the total volume of the ethylene used was 1000 cm$^3$, and the volume of the potassium permanganate solution was 1 L; and the pressure of the gas pump was 0.018 MPa, and the pore size of the filter element was 0.45 μm.

Comparative Example 1

In this comparative example, a carbon-coated lithium nickel cobalt manganese oxide was used to prepare a potassium permanganate coating layer. The preparation method was as follows: 500 g of $LiNi_{0.9}Co_{0.05}Mn_{0.05}O_2$ coated with C on the surface was taken and placed in 1 L of a neutral potassium permanganate solution with a concentration of 0.5% in mass fraction at a temperature of 20° C., such that the cathode material was fully immersed in the potassium permanganate solution; and after the reaction was completed, the cathode material was separated from the solution, and the cathode material was placed in an oven, dried at 70° C. for 10 h, and then calcined at 450° C. in a muffle furnace for 8 h.

Comparative Example 2

In this comparative example, a manganese dioxide coating layer was prepared by a common precipitation method. The preparation method was as follows: 500 g of $LiNi_{0.9}Co_{0.05}Mn_{0.05}O_2$ was taken and placed in 1 L of a neutral potassium permanganate solution with a concentration of 0.5% in mass fraction at a temperature of 20° C., such that the cathode material was fully immersed in the potassium permanganate solution, and 5 g of manganese hydroxide was then added to the solution and dissolved; and after the precipitation was completed, the cathode material was separated from the solution, the cathode material was placed in an oven, dried at 70° C. for 10 h, and then calcined at 450° C. in a muffle furnace for 8 h.

Performance Test

Test process: The cathode materials obtained in the examples and comparative examples were made into button batteries for testing the electrochemical performance of lithium ion batteries, and the specific steps thereof were as follows: the cathode active material was uniformly mixed with acetylene black and PVDF in N-methylpyrrolidone as a solvent at a mass ratio of 9.2:0.5:0.3, then applied to an aluminum foil, dried in forced air at 80° C. for 8 h, and dried in vacuum at 120° C. for 12 h. The battery was assembled in an argon-protected glove box, wherein the negative electrode was a lithium metal sheet, the separator was a polypropylene film, and the electrolyte solution was 1M LiPF6-EC/DMC (1:1, v/v). A button battery was assembled using a 2032 button battery case in an argon-protected glove box and then subjected to an electrochemical performance test at 25° C. at 3.0-4.5 V.

Test results were as shown below in Table 1.

TABLE 1

| Performance | Discharge capacity at 0.1 C, mAh/g | Specific discharge capacity after 100 cycles, mAh/g | Cyclic retention rate |
|---|---|---|---|
| Example 1 | 206.1 | 193.1 | 93.7% |
| Example 2 | 205.7 | 191.2 | 93.0% |
| Example 3 | 208.5 | 189.7 | 90.1% |
| Example 4 | 208.4 | 193.6 | 92.0% |
| Example 5 | 209.7 | 184.5 | 88.0% |
| Example 6 | 208.6 | 185.8 | 89.1% |
| Comparative Example 1 | 194.2 | 163.5 | 84.2% |
| Comparative Example 2 | 195.2 | 161.4 | 82.7% |

The FIGURE was a diagram of a manganese-dioxide-coated lithium nickel cobalt manganese oxide cathode material prepared in Example 1, and Table 1 showed the electrochemical performance test results. When the manganese-dioxide-coated lithium nickel cobalt manganese oxide cathode materials prepared in the examples of the present disclosure were used in button batteries, the discharge capacity at 0.1 C was 200 mAh/g or more, the specific discharge capacity after 100 cycles was 180 mAh/g, and the cyclic retention rate reached 88% or more.

Among them, Example 5, in which no filter element was added, had larger bubbles, more difficult adhering, a reduced amount of coating, and a slightly reduced cycling performance. In Example 6, the temperature of the mixing reaction and the mass concentration of the potassium permanganate solution were too high, and the reaction was too fast, such that many ethylene bubbles had already reacted before they reached the surface of the particles, thus causing substantial manganese dioxide precipitation. Even if the amount of the introduced ethylene gas was increased, the coating effect was still not as good as that of Example 1.

Finally, it should be noted that the above embodiments are only used to illustrate the technical solution of the present disclosure, rather than limiting the scope of protection of the present disclosure. Although the present disclosure has been described in detail with reference to the preferred embodiments, those of ordinary skill in the art should understand that the technical solution of the present disclosure can be modified or equivalently substituted without departing from the essence and scope of the technical solution of the present disclosure.

The invention claimed is:

1. A method for coating a lithium nickel cobalt manganese oxide cathode material, comprising the following steps:
   (1) mixing the lithium nickel cobalt manganese oxide cathode material with a potassium permanganate solution, and introducing an olefin; and
   (2) after a reaction is completed, subjecting a reaction product to drying and calcination, to obtain a manganese-dioxide-coated lithium nickel cobalt manganese oxide cathode material;
   wherein a number of carbon atoms in the olefin is less than or equal to 10, and a number of carbon-carbon double bonds in the olefin is 1.

2. The method for coating the lithium nickel cobalt manganese oxide cathode material according to claim 1, wherein the olefin is ethylene.

3. The method for coating the lithium nickel cobalt manganese oxide cathode material according to claim 1, wherein in step (1), a mass concentration of the potassium permanganate solution is 0.5% to −2%, and a temperature of the mixing is 10° C. to −25° C.

4. The method for coating the lithium nickel cobalt manganese oxide cathode material according to claim 1, wherein in step (1), a method for introducing the olefin involves introducing the olefin in batches, wherein a gas pump is used for introducing the olefin, and the gas pump is provided with a gas pipe equipped with a filter element.

5. The method for coating the lithium nickel cobalt manganese oxide cathode material according to claim 4, wherein a number of introducing the olefin is 3 to −10 times, and a ratio of a total volume of the introduced olefin to a volume of the potassium permanganate solution is (0.3-1): 1.

6. The method for coating the lithium nickel cobalt manganese oxide cathode material according to claim 5, wherein the number of introducing the olefin is 3 to −5 times, and the ratio of the total volume of the introduced olefin to the volume of the potassium permanganate solution is (0.3-0.5): 1.

7. The method for coating the lithium nickel cobalt manganese oxide cathode material according to claim 4, wherein the gas pump has a pressure of 0.013 MPa to −0.020 MPa, and the filter element has a pore size of 0.2 μm to −0.5 μm.

8. The method for coating the lithium nickel cobalt manganese oxide cathode material according to claim 1, wherein in step (2), a temperature for the drying is 60° C. to −80° C., and a time for the drying is 8 h to −12 h; and a temperature for the calcination is 450° C. to −550° C., and a time for the calcination is 6 h to −8 h.

9. A lithium nickel cobalt manganese oxide cathode material obtained by using the method for coating the lithium nickel cobalt manganese oxide cathode material according to claim 1.

* * * * *